United States Patent

Morishita et al.

[11] Patent Number: 6,149,237
[45] Date of Patent: Nov. 21, 2000

[54] VEHICULAR SEAT STRUCTURE

[75] Inventors: Kentaro Morishita, Nagoya; Naoaki Hoshihara, Aichi-ken; Yukifumi Yamada, Toyota; Hideaki Honjo, Chiryu, all of Japan

[73] Assignee: Aisin Seiki Kabushiki Kaisha, Kariya, Japan

[21] Appl. No.: 09/161,759

[22] Filed: Sep. 29, 1998

[30] Foreign Application Priority Data

Sep. 29, 1997 [JP] Japan ................................. 9-263557

[51] Int. Cl.$^7$ ........................................................ B60N 2/02
[52] U.S. Cl. ........................ 297/353; 296/65.16; 297/341
[58] Field of Search ............................. 297/341, 378.12, 297/353; 296/65.16, 65.13

[56] References Cited

U.S. PATENT DOCUMENTS

| | | | |
|---|---|---|---|
| 4,131,316 | 12/1978 | Pallant et al. | 297/341 |
| 5,020,853 | 6/1991 | Babbs | 297/341 |
| 5,522,643 | 6/1996 | Matsuura | 297/378.12 X |
| 5,531,503 | 7/1996 | Hughes | 297/341 |
| 5,597,206 | 1/1997 | Ainsworth | 297/378.125 |
| 5,611,600 | 3/1997 | Busch et al. | 297/378.12 |
| 5,695,247 | 12/1997 | Premji | 297/341 |

FOREIGN PATENT DOCUMENTS 3-121939  5/1991  Japan .

*Primary Examiner*—Peter M. Cuomo
*Assistant Examiner*—Stephen Vu
*Attorney, Agent, or Firm*—Burns, Doane, Swecker & Mathis, LLP

[57] ABSTRACT

To reduce the gap between the floor portion of a cargo compartment in a vehicle and a seat back when the cargo compartment is enlarged by forwardly bringing down the seat back of the passenger seat adjoining the driver or a rear seat, a vehicular seat structure is designed so that when the seat back of the rear seat is forwardly brought down by a predetermined angle, a pin provided on a bell crank is brought into contact with an upper end portion of a second link, and the second link is rotated. As a result, a first link is pulled upward and the bell crank is rotated so that the rear end portion of a slide lock lever is rotated in the direction causing the slide lock to be released. Thereafter, when the seat back is brought down further forwardly, a connecting member which can be in the form of one or more belts moves the seat rearwardly. A stopper contacts the first link and the movement of the seat is stopped.

27 Claims, 14 Drawing Sheets

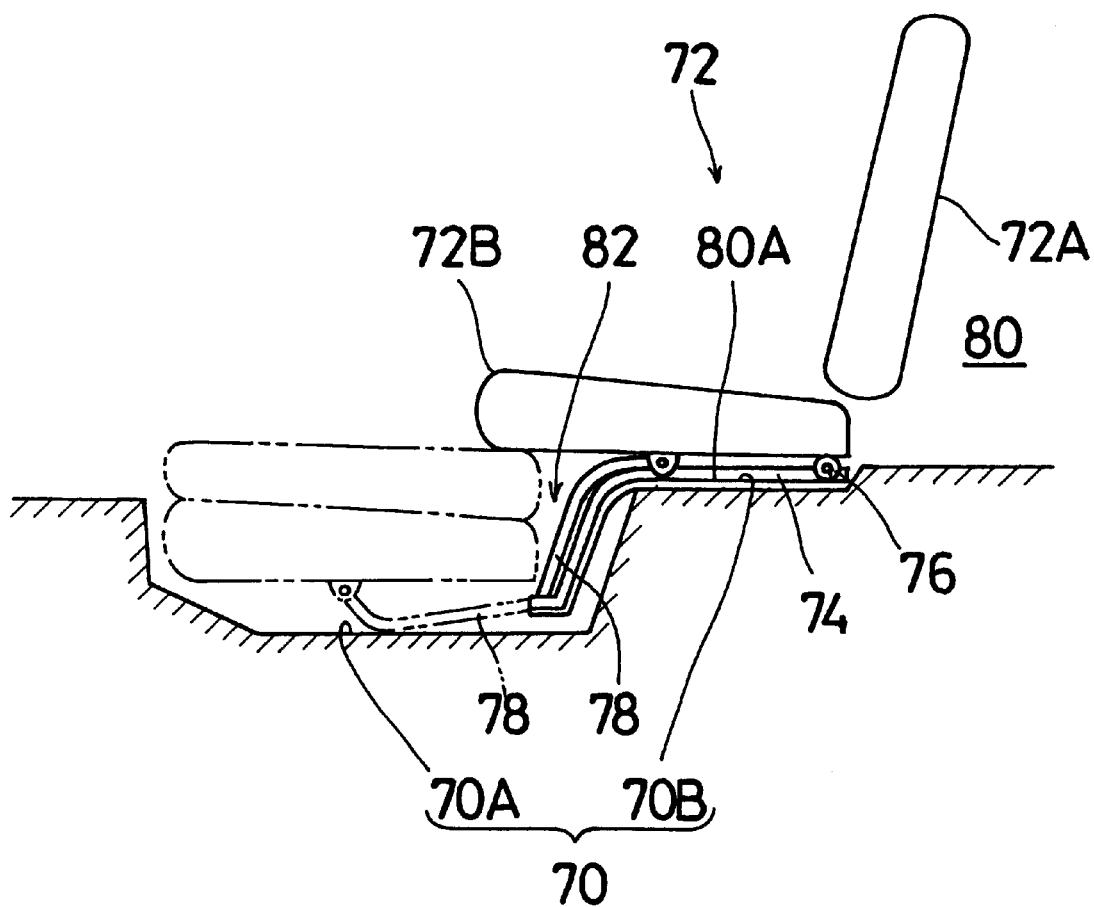

VEHICULAR SEAT STRUCTURE

This application corresponds to and claims priority under 35 U.S.C. § 119 with respect to Japanese Application No. 09(1997)-263557 filed on Sep. 29, 1997, the entire content of which is incorporated herein by reference.

FIELD OF THE INVENTION

The present invention generally relates to a vehicular seat structure. More particularly, the present invention pertains to a vehicular seat structure having a seat back that is capable of being folded downwardly in a forward direction to increase the cargo space of the vehicle.

BACKGROUND OF THE INVENTION

Vehicular seat structures involving a passenger seat next to the driver's seat and rear seats are known that are capable of being moved to enlarge the space of the cargo compartment by forwardly bringing down the seat back of the seat structure. An example of such a seat structure is disclosed in Japanese Unexamined Patent Publication No. JP-A-3-121939.

This seat structure is shown in FIG. 14 and is adapted to be mounted on a vehicle having a lower floor portion 70A and an upper floor portion 70B disposed rearwardly of the lower floor portion 70A in a floor 70 of a vehicle. A seat structure 72 is arranged on the upper floor portion 70B and includes a foldably supported seat back 72A and a seat cushion 72B. Further, a guide rail 74 extending in the forward and rearward direction is arranged on the upper floor portion 70B. A front end side of the guide rail 74 is bent downwardly and extends to the vicinity of the upper face of the rear portion of the lower floor portion 70A. A slider 76 moves along the guide rail 74 and is attached at the rear end portion of the seat cushion 72B of the seat 72. A support leg 78 for supporting the seat 72 during forward movement of the seat 72 is interposed between the seat cushion 72B and the rear portion of the lower floor portion 70A. The position of the seat 72 can be changed to either a position for use on the upper floor portion 70B (the position indicated by the solid line in FIG. 14) or a stored position on the lower floor portion 70A (the position indicated by the two-dotted chain line in FIG. 14). Meanwhile, a lock mechanism (not illustrated) is installed between the seat 72 and the guide rail 74 for locking the forward and rearward movement of the seat 72 at least at the position for use on the upper floor portion 70B and the position for storage on the lower floor portion 70A.

In this vehicular seat structure, when the seat 72 is disposed at the position for storage (the position indicated by the two-dotted chain line in FIG. 14) on the lower floor portion 70A, the seat back 72A is brought down forwardly onto the seat cushion 72B and the space or size of the cargo compartment 80 formed on the rear side of the seat back 72A is enlarged. However, a large gap 82 is produced between the floor portion 80A of the enlarged cargo compartment 80 and the seat back 72A of the seat 72 and this tends to reduce the actual performance of use.

In light of the foregoing, a need exists for a vehicular seat structure that is capable of reducing the gap between the floor portion of the cargo compartment and the seat back when the cargo compartment is enlarged by forwardly bringing down the seat back.

SUMMARY OF THE INVENTION

According to one aspect of the invention, a vehicular seat structure includes a lockable slide mechanism for making a seat slidable in the forward and rearward direction of a vehicle, a reclining mechanism for forwardly bringing down a seat back of the seat to enlarge the size of the vehicle cargo compartment, a slide lock release mechanism for releasing the locking of the slide mechanism while forwardly bringing down the seat back, and a moving mechanism for rearwardly moving the seat after releasing the locking of the slide mechanism.

When the seat back is forwardly inclined, the slide lock is released by the slide lock release mechanism and the forward and rearward position of the seat can be adjusted. Therefore, after releasing the slide lock, the seat is moved rearwardly by the moving mechanism. As a result, the cargo compartment can be enlarged by forwardly bringing down the seat back and the gap between the floor portion of the cargo compartment and seat back can be reduced by rearwardly moving the position of the seat.

According to another aspect of the invention, a vehicular seat structure is provided with a seat having a forwardly foldable seat back, a slide mechanism operatively associated with the seat for permitting the seat to slide in the forward and rearward direction, a slide lock lever for engaging the slide mechanism to lock the slide mechanism and prevent the seat from sliding in the forward and rearward direction, a reclining mechanism for forwardly bringing down the seat back of the seat, and a slide lock release mechanism operatively connected to the slide lock lever for releasing the slide lock lever in response to forwardly bringing down the seat back to permit the seat to slide in the forward and rearward direction. A moving mechanism is also provided for moving the seat in the rearward direction after releasing the slide lock lever.

In accordance with another aspect of the invention, a vehicular seat structure includes a seat having a forwardly foldable seat back, a slide mechanism operatively associated with the seat for permitting the seat to slide in a forward and rearward direction, a slide lock lever for engaging the slide mechanism to lock the slide mechanism and prevent the seat from sliding in the forward and rearward direction, and a reclining mechanism for forwardly bringing down the seat back of the seat. A slide lock release mechanism is operatively connected to the slide lock lever for releasing the slide lock lever to permit the seat to slide in the forward and rearward direction, and a moving mechanism automatically moves the seat in the rearward direction after releasing the slide lock lever.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein:

FIG. 14 is a side view of a known vehicular seat structure.

DETAILED DESCRIPTION OF THE PREFERRED EMBODIMENTS

Figure 1:
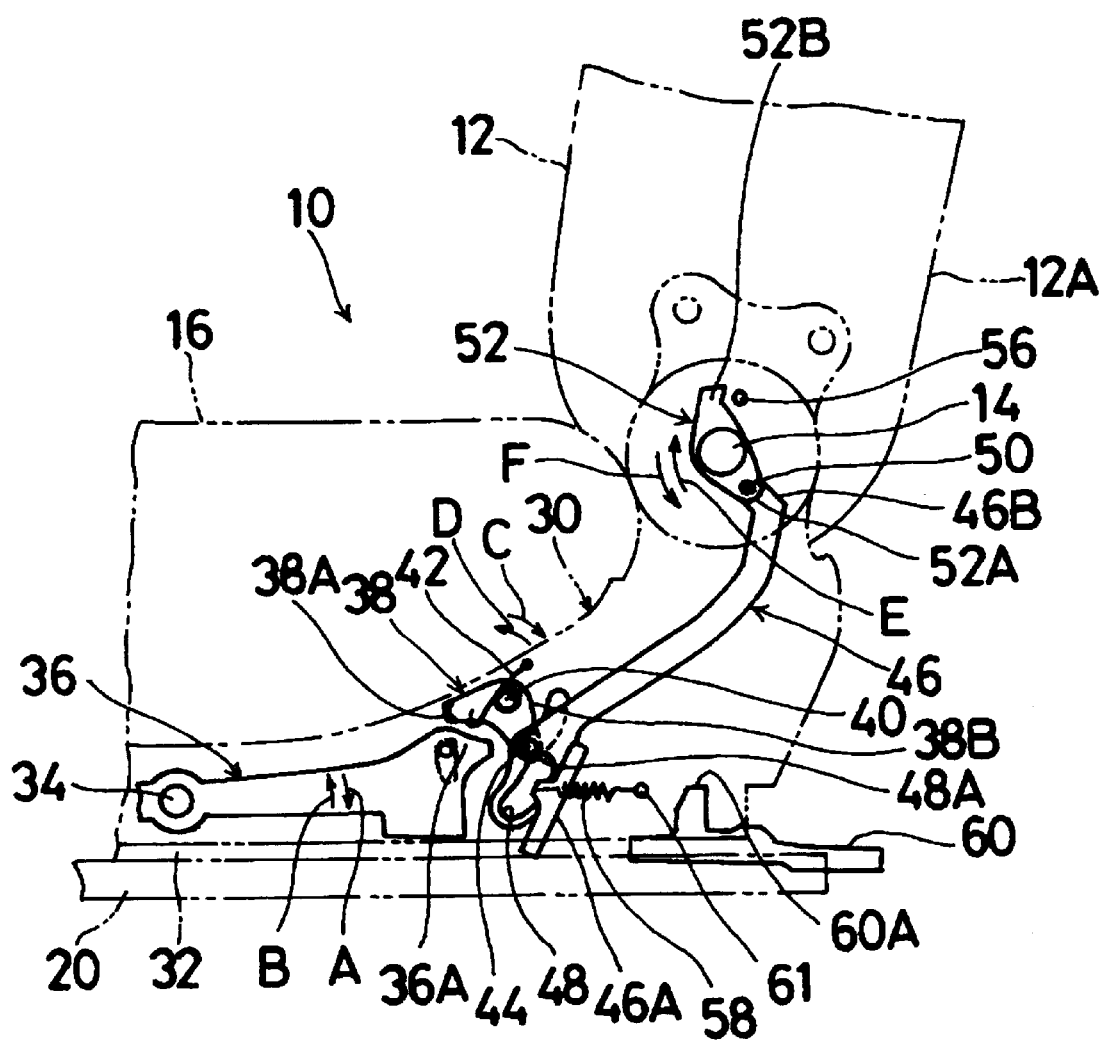
FIG. 1 is a side view of a vehicular seat structure according to an embodiment of the present invention.

An embodiment of the vehicular seat structure according to the present invention will be described below with reference to FIGS. 1–9. The arrow designated FR in the drawing figures designates the front direction of the vehicle and the arrow designated UP designates the upward direction of the vehicle.

Figure 2:
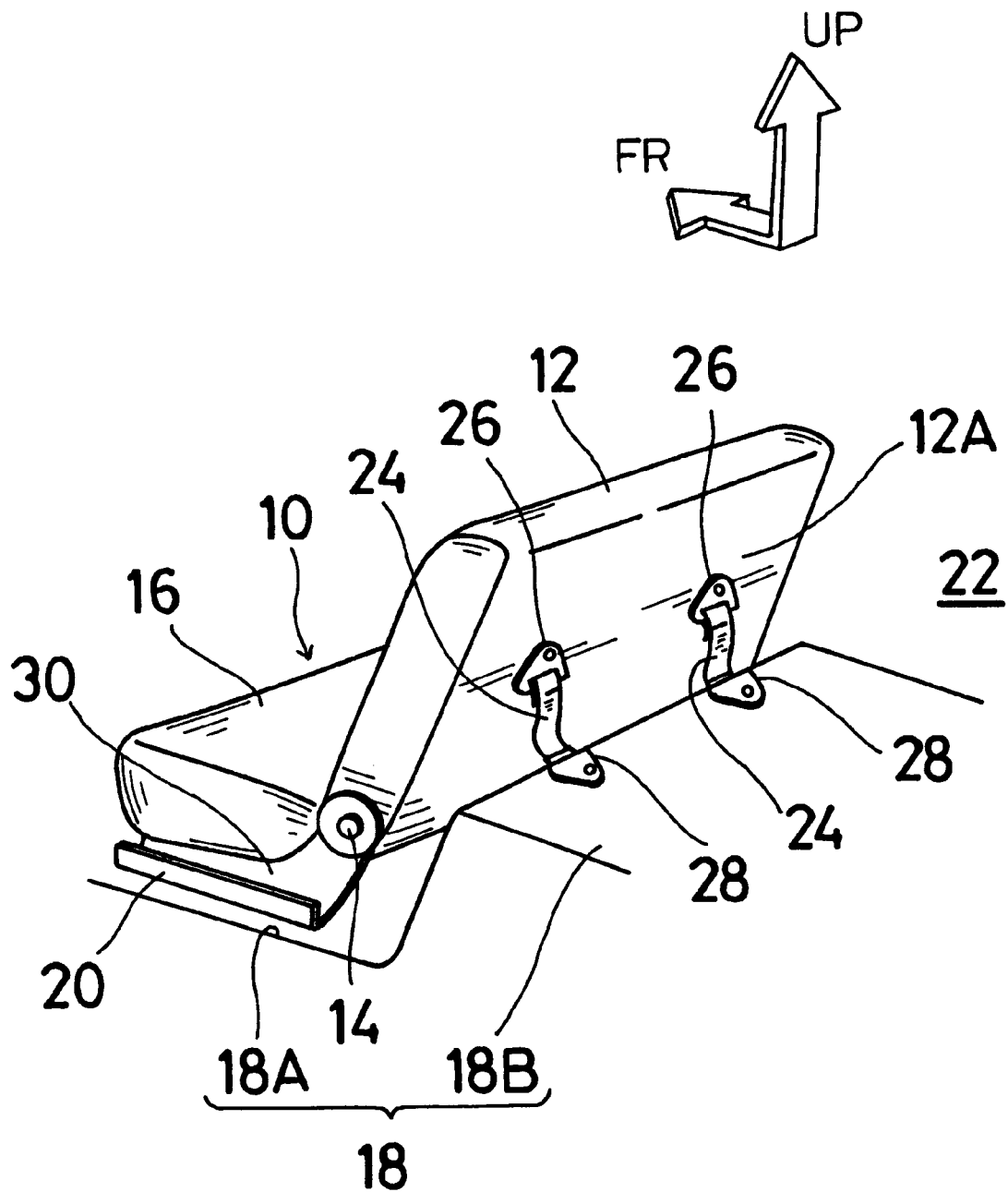
FIG. 2 is a rear perspective view of a rear seat to which the vehicular seat structure according to the present invention is applied.

As shown in FIG. 2, a rear seat 10 of a vehicle embodying the vehicular seat structure according to the present invention includes a well-known reclining mechanism that allows the seat back 12 to be brought down forwardly on a seat cushion 16 centering on a rotating shaft 14. The vehicle has a floor 18 that includes a lower floor portion 18A and an upper floor portion 18B. The rear seat 10 is slidable in a known manner in the forward and rearward direction of the vehicle along a pair of seat track lower rails 20 arranged along the forward and rearward direction of the vehicle on the lower floor portion 18A of the vehicle.

The upper floor portion 18B is disposed rearwardly of the lower floor portion 18A and constitutes a floor portion of a cargo compartment 22. The seat back 12 is connected to the upper floor portion 18B by a pair of belts 24 which constitute connecting members also forming a moving mechanism. The belts 24 include left and right belts each having an end portion that is attached to the substantially central portion of a rearwardly facing back surface 12A of the seat back 12 with respect to the up and down direction. The ends of the belts 24 are attached to the substantially central portion of the rearwardly facing back surface 12A of the seat back 12 via attaching brackets 26. The opposite end portions of the belts 24 are attached to the forward region of the upper floor portion 18B via attaching brackets 28.

As shown in FIG. 1, seat cushion side frames 30 are arranged at both side portions of the seat cushion 16 along the forward and backward direction of the vehicle. Seat track upper rails 32 constituting a portion of a slide mechanism are arranged at the lower end portions of the seat cushion side frames 30. The seat track upper rails 32 are slidably set onto the seat track lower rails 20. Further, slide lock levers 36 are supported by a shaft 34 mounted on the seat cushion side frames 30. The slide lock levers 36 are rotatably supported in the clockwise direction of FIG. 1, which is represented by the arrow designated A in FIG. 1, and in the counterclockwise direction, which is represented by the arrow designated B in FIG. 1. Further, in the state shown in FIG. 1, the front end portion of the slide lock lever 36 is brought into a locked state so that the rear seat 10 is prevented from being slid in the forward and rearward direction.

A bell crank 38 constituting a portion of a slide lock release mechanism is arranged above the rear end portion 36A of the slide lock lever 36. The bell crank 38 is rotatably supported by a shaft 40 mounted on the seat cushion side frames 30 for rotation in the clockwise direction (i.e., in the direction of the arrow designated C in FIG. 1) and in the counterclockwise direction (i.e., in the direction of the arrow designated D in FIG. 1). A coil spring 42 is wound around the shaft 40 and one end portion of the coil spring 42 is engaged with a hole provided in the seat cushion side frame 30. The opposite end portion of the coil spring 42 contacts the lower portion of an arm portion 38A on the front side of the bell crank 38 for urging the bell crank 38 in the direction of the arrow designated C in FIG. 1.

A pin 44 extends from an arm portion 38B on the rear side of the bell crank 38 and the pin 44 is inserted into a notch 48 formed at the lower end portion 46A of a first link 46 constituting a portion of the slide lock release mechanism and a cancel mechanism. The notch 48 possesses a substantially L-shaped configuration. The pin 44 is engaged with an engaging portion 48A formed at the upper end of the notch 48 in a state where the rear seat 10 is not disposed at the proper position or fully folded position, mentioned later, and the seat back 12 is upright (i.e. the position shown in FIG. 1).

Figure 3:
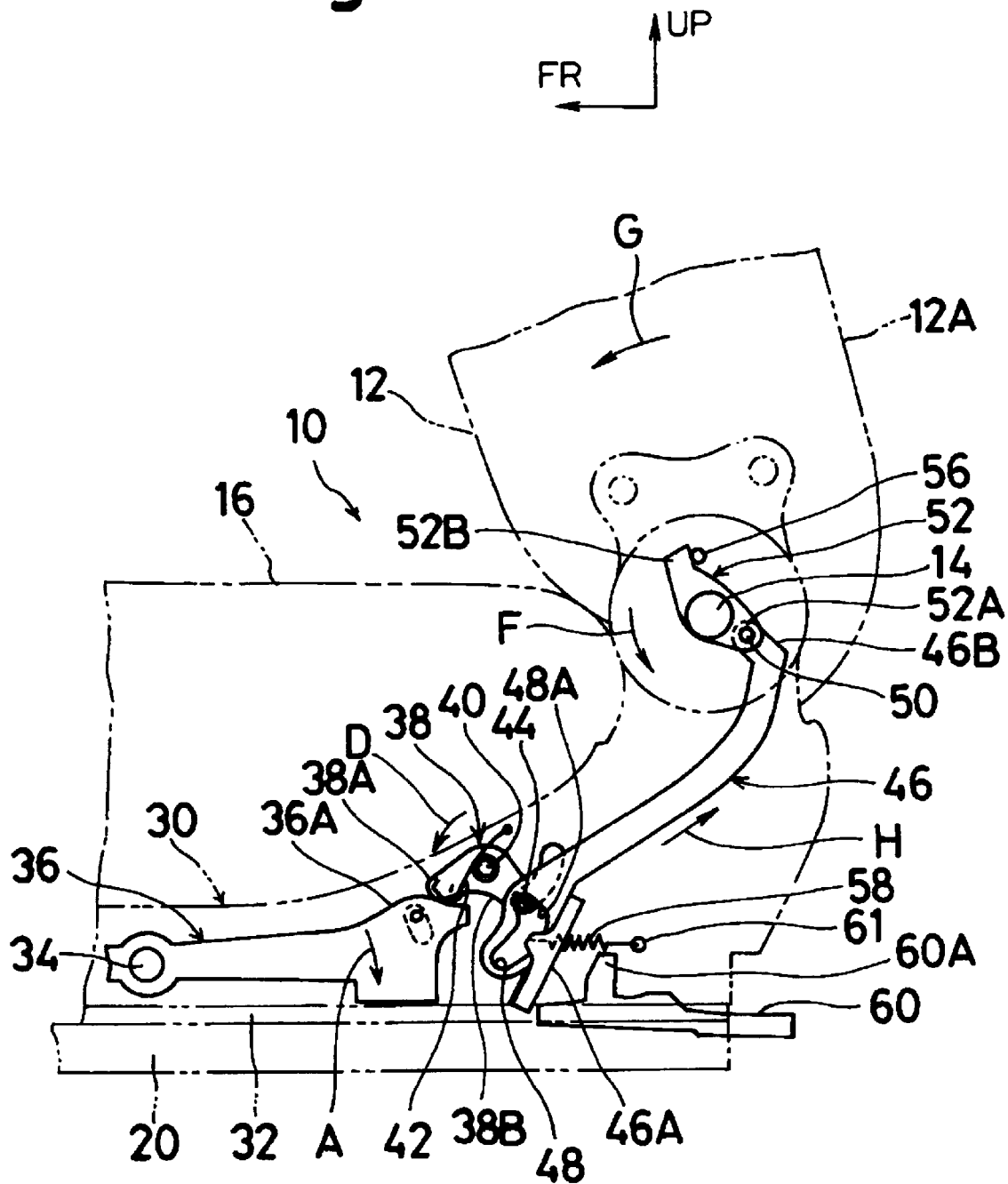
FIG. 3 is a side view of the vehicular seat structure shown in FIG. 1 illustrating the state in which the seat back is forwardly brought down by a predetermined angle.

The upper end portion 46B of the first link 46 is rotatably connected to a lower end portion 52A of a second link 52, which constitutes a portion of the slide lock release mechanism, by a pin 50. The second link 52 is rotatably supported by the rotating shaft 14 for rotating in the clockwise direction (i.e., the direction indicated by the arrow E in FIG. 1) and in the counterclockwise direction (i.e., the direction indicated by the arrow F in FIG. 1). Further, the upper end portion 52B of the second link 52 is arranged at a position capable of being brought into contact with a pin 56 installed at the side frame of the seat back 12. As shown in FIG. 3, when the seat back 12 is brought down forwardly (i.e., in the direction indicated by the arrow G in FIG. 3), the pin 56 is brought into contact with the upper end portion 52B of the second link 52 and the second link 52 is rotated in the counterclockwise direction (i.e., in the direction indicated by the arrow F in FIG. 3).

Further, as shown in FIG. 3, when the second link 52 is rotated in the counterclockwise direction (i.e., in the direction indicated by the arrow F in FIG. 3), the first link 46 is pulled up in the direction of the arrow H in FIG. 3, and the bell crank 38 from which extends the pin 44 that engages the engaging portion 48A of the notch 48 is rotated in the direction of the arrow designated D in FIG. 3. As a result, the rear end portion 36A of the slide lock lever 36 is pushed down and the slide lock lever 36 is rotated in the direction indicated by the arrow A in FIG. 3 which constitutes the lock release direction.

As shown in FIG. 1, a stopper 60 is arranged on the rear side of the lower end portion 46A of the first link 46 and this stopper 60 is fixed to the seat track lower rail 20. The stopper 60 is provided with a projecting portion 60A having an inclined front upper portion. The projecting portion 60A is directed upwardly from the vicinity of the front end portion of the stopper 60. When the rear seat 10 is retrogressed or moved to the proper position (i.e., a position at which the rear seat 10 is located most adjacent to the upper floor portion 18B constituting a floor portion of the cargo compartment 22), the projecting portion 60A of the stopper 60 is brought into contact with a rear portion of the lower end portion 46A of the first link 46. When the rear seat 10 is further retrogressed, the projecting portion 60A pushes up the first link 46 in a skewed front upper direction.

Figure 4:
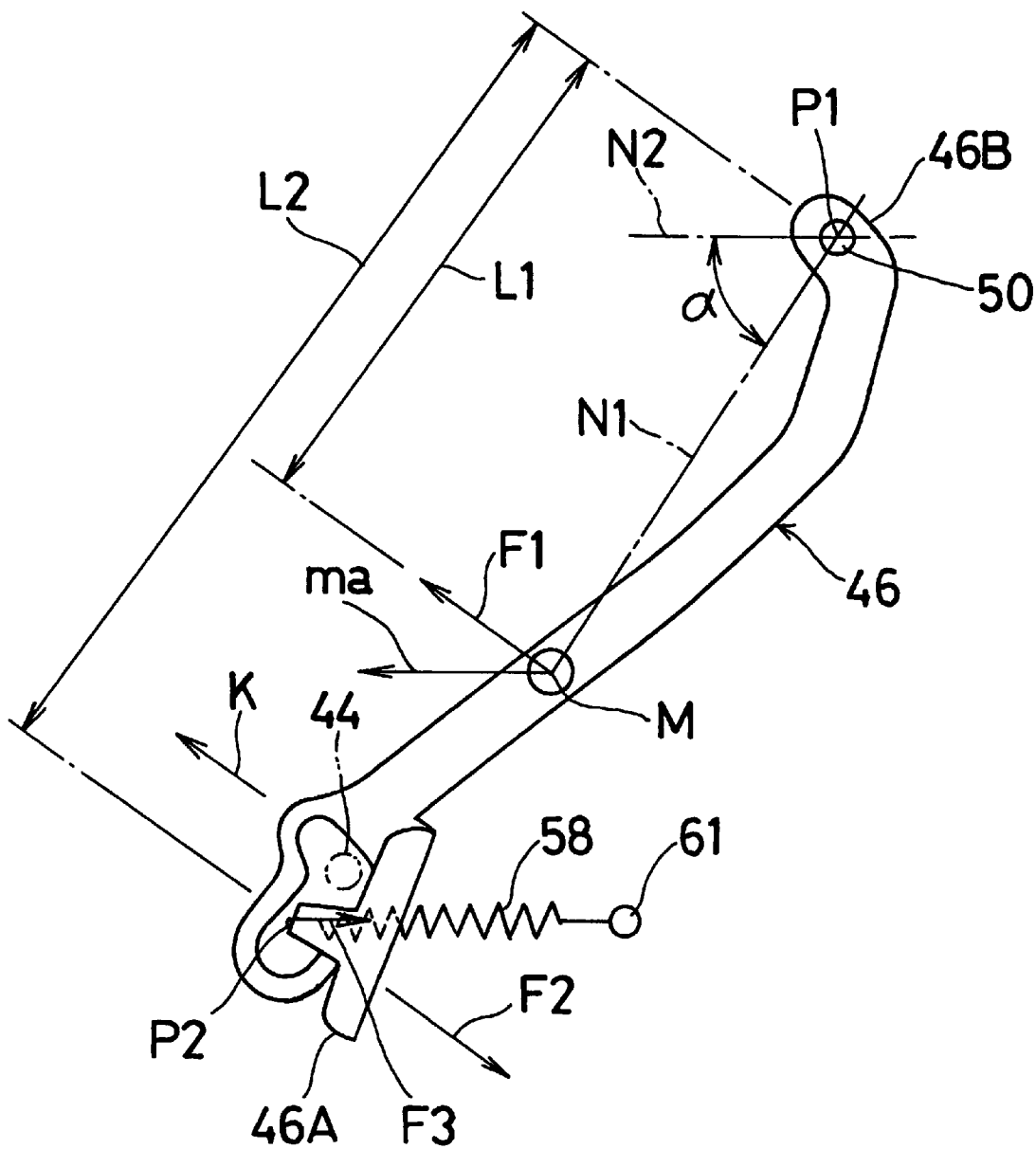
FIG. 4 is a side view of a first link used in the vehicular seat structure according to the present invention.
Figure 5:
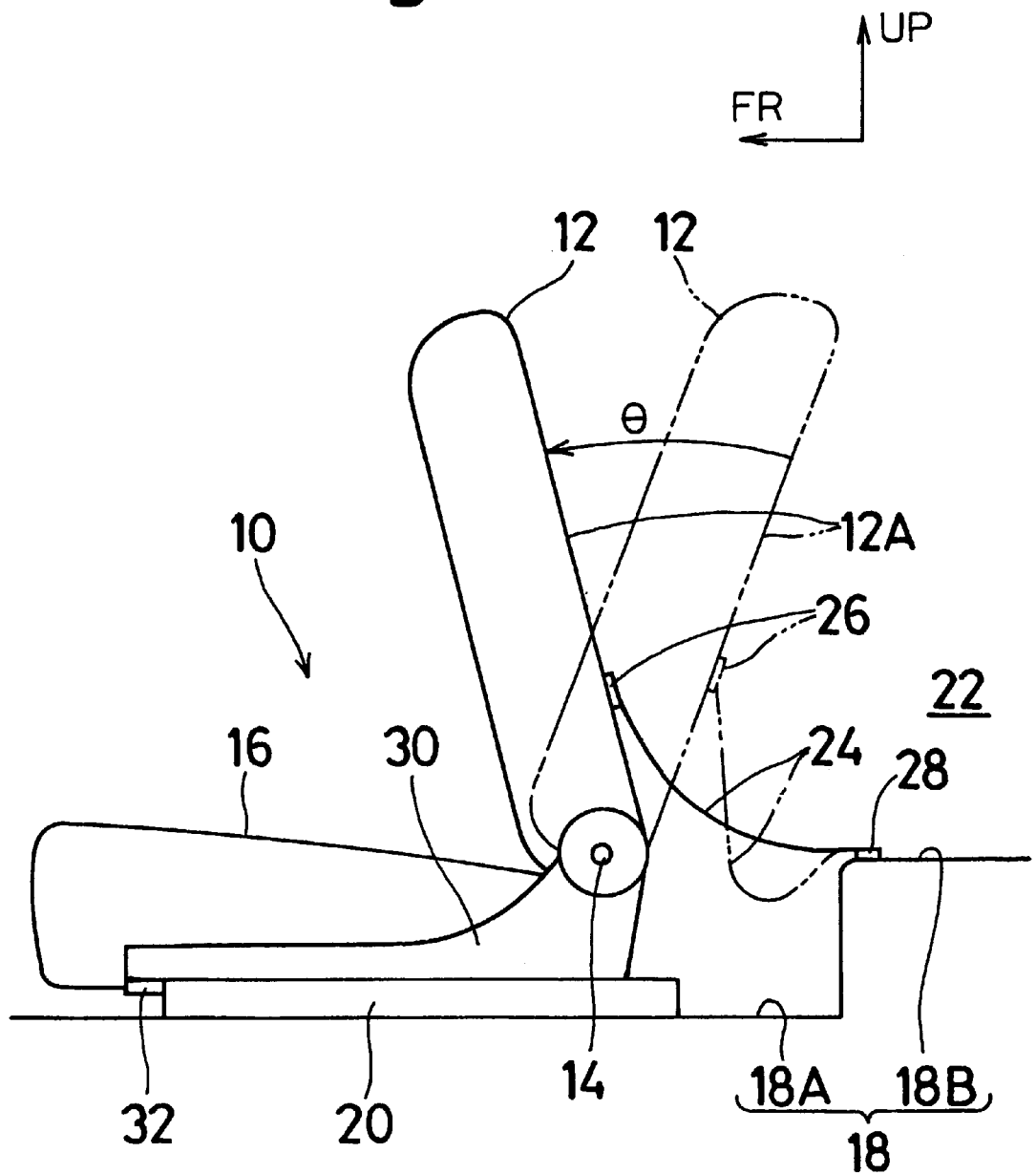
FIG. 5 is a side view of a rear seat in which the vehicular seat structure according to the present invention is embodied illustrating the seat back being moved forwardly through a predetermined angle.

As shown in FIGS. 3 and 4, the lower end portion 46A of the first link 46 is connected to a pin 61 that is mounted on the seat cushion side frame via a coil spring 58. When acceleration having a predetermined value of "a" or more is applied from the rear side of the vehicle, the lower end portion 46A of the first link 46 is moved in a skewed front upper direction (i.e., in the direction of the arrow designated K in FIG. 4) against the urging force of the coil spring 58 (F1×L1>F2×L2).

That is, the following equation is established between the tension F3 of the coil spring 58 (tension at the full stoke of the first link 46), the mass "m" of the first link 46, the distance L1 from the gravitational center M to the point PI at which the pin 50 engages the upper end portion 46B of the link 46, the distance L2 from the point P2 at which the lower end portion 46A of the first link 46 engages the coil spring 58, the angle of inclination α of the first link 46 (i.e., the angle α between a horizontal line N2 passing through the point P1 and a straight line N1 connecting the gravitational center M and the engaging point PI), wherein the mass "m" of the first link 46 is set as m>(F3×L2)/(a×L1).

$$m \times \sin\alpha \times L1 > F3 \times \sin\alpha \times L2.$$

The operation of the vehicle seat structure according to the present invention is as follows. When the seat back 12 of the rear seat 10 is brought down forwardly from the normally used upright position designated by the two-dotted chain line in FIG. 5 to the position designated by a solid line in FIG. 5 (i.e., the seat back is moved forwardly through an angle θ), the pin 56 shown in FIG. 3 contacts the upper end portion 52B of the second link 52 and the second link 52 is rotated in the counterclockwise direction (i.e., in the direction of the arrow F in FIG. 3). As a result, the first link 46 is pushed up in the direction indicated by the arrow H in FIG. 3. The bell crank 38 then rotates in the counterclockwise direction (i.e., in the direction indicated by the arrow D in FIG. 3) through engagement of the pin 44 with the engaging portion 48A of the notch 48 in the first link 46. The rear end portion 36A of the slide lock lever 36 is thus pushed downwardly (i.e., is rotated in the direction of the arrow A in FIG. 3) and the slide lock is released.

Figure 6:
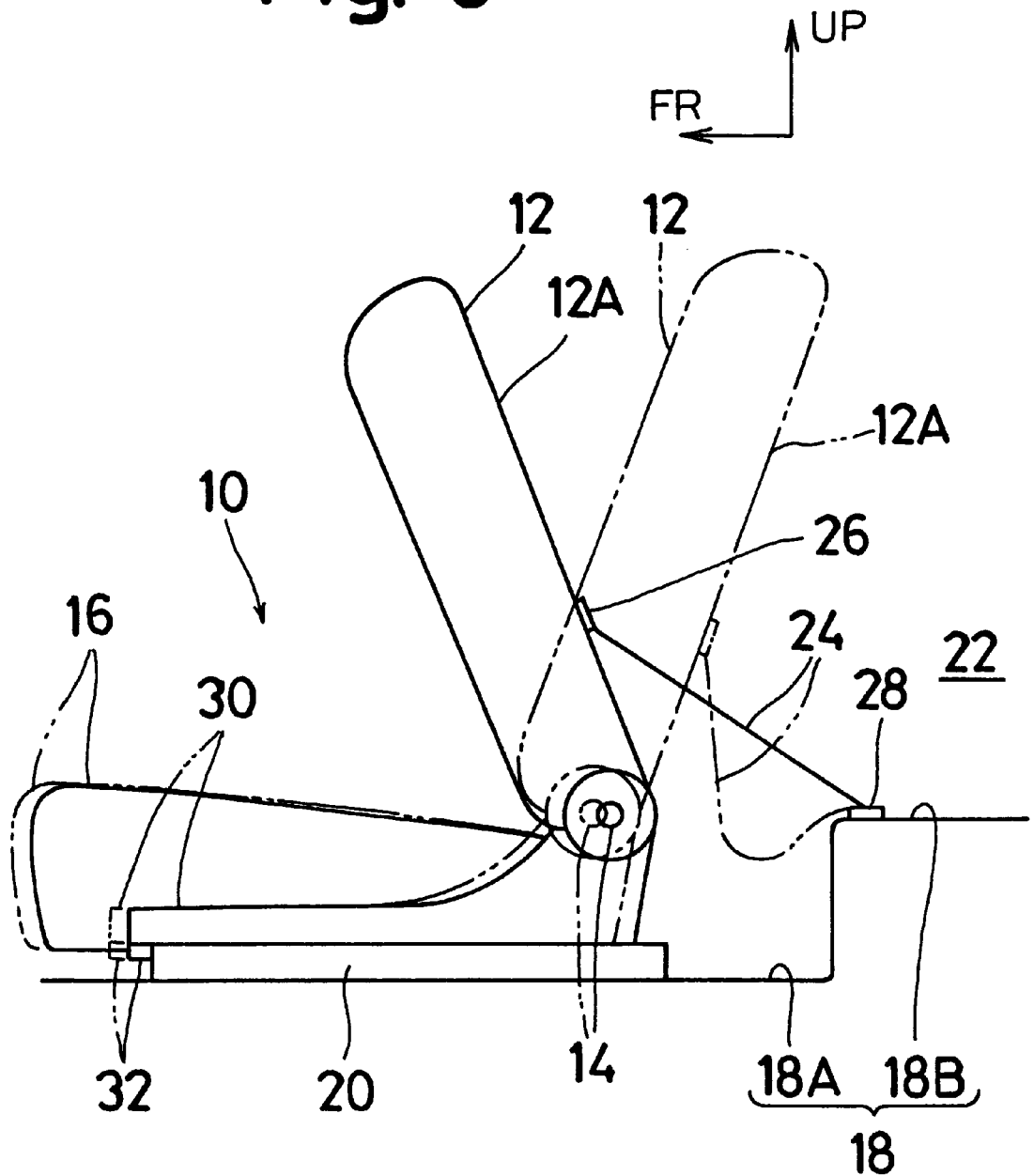
FIG. 6 is a side view of the rear seat shown in FIG. 5 illustrating the seat back being forwardly brought down by a predetermined angle.

When the seat back 12 is brought down further forwardly after releasing the slide lock, as shown by a solid line in FIG. 6, the rear seat 10 is automatically retrogressed or moved rearwardly by tension operating on the belts 24 that are attached to the back surface 12a of the seat back 12.

Figure 7:
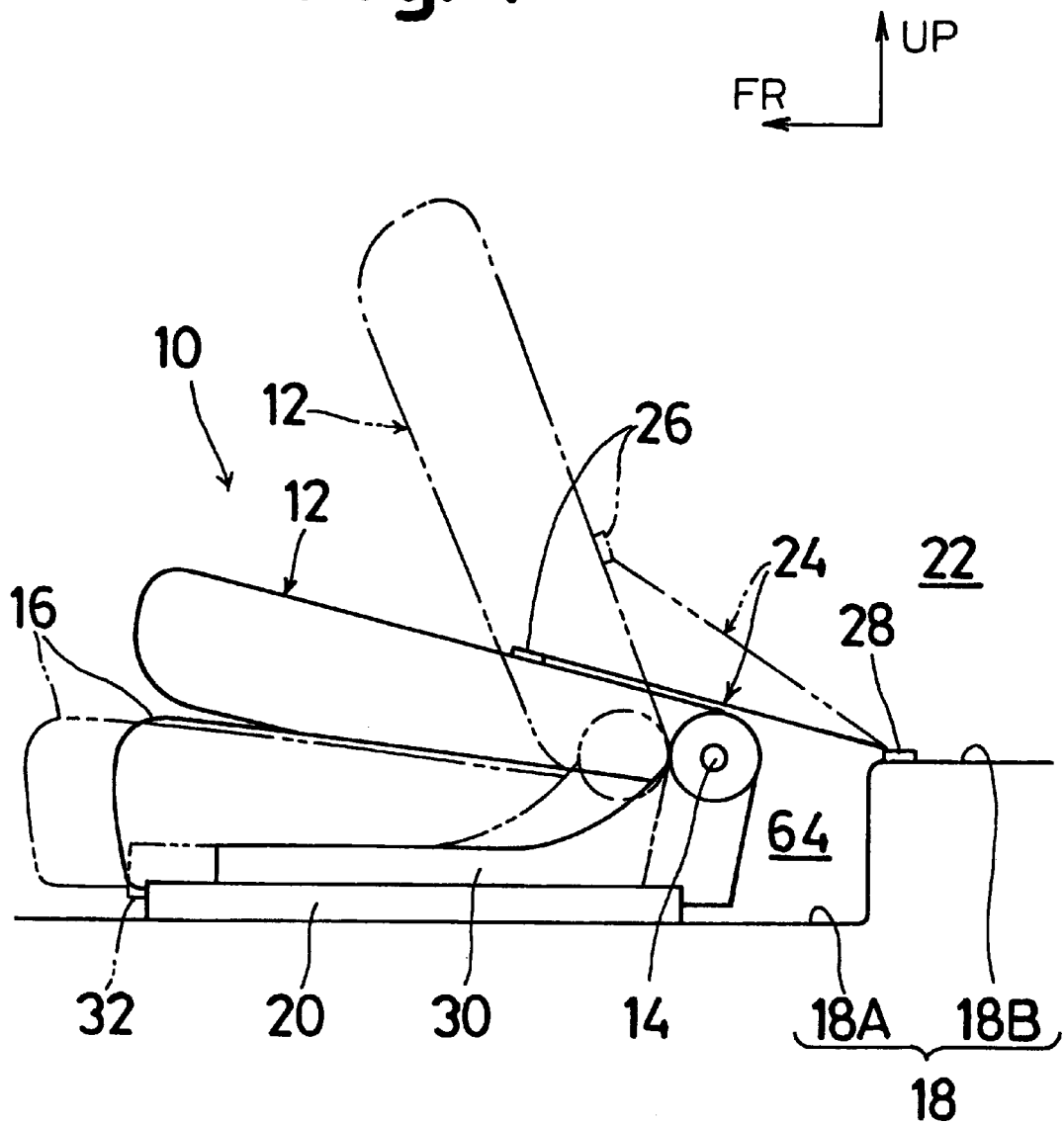
FIG. 7 is a side view of the rear seat shown in FIG. 5 illustrating the seat back being forwardly brought down through a further angle.
Figure 8:
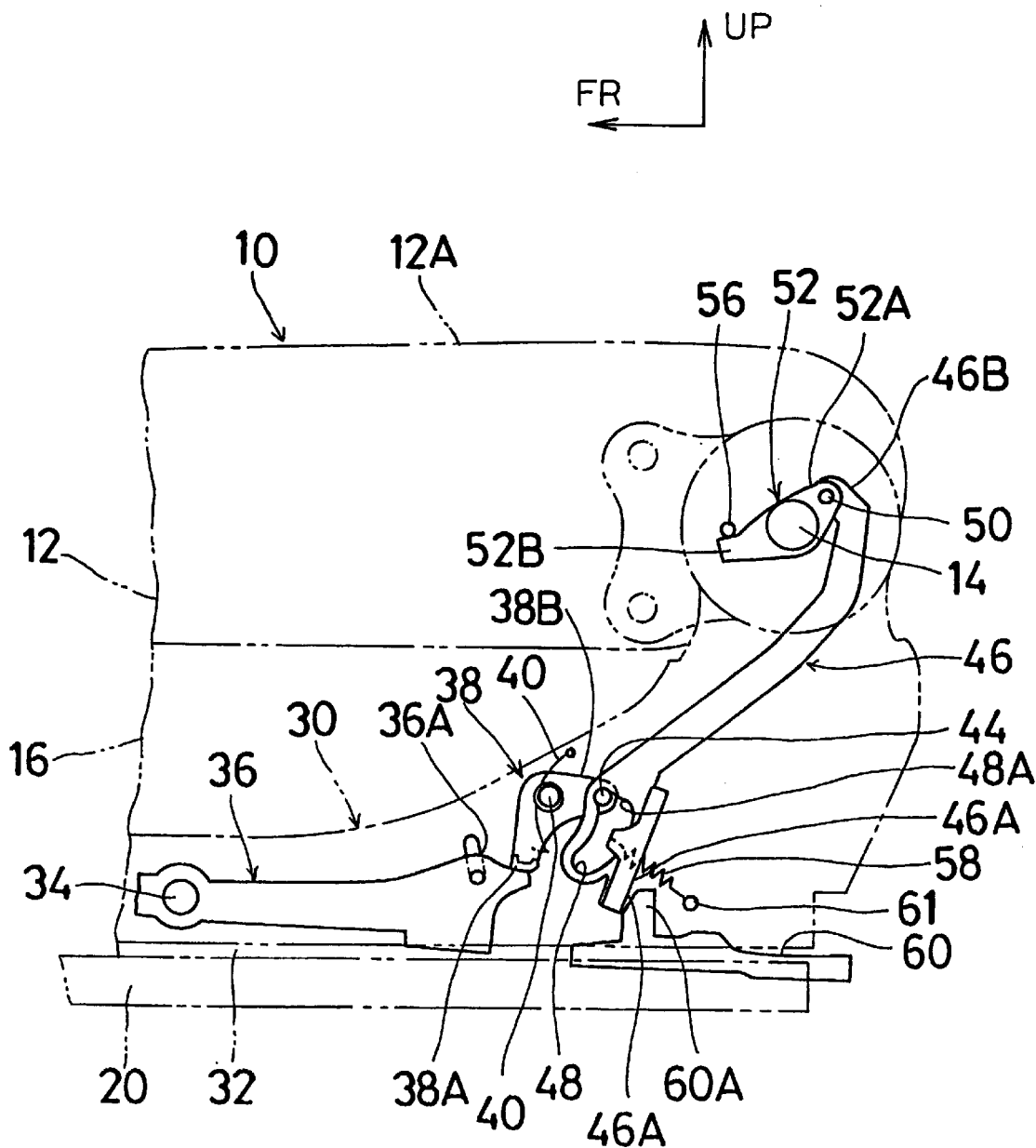
FIG. 8 is a side view of the vehicular seat structure according to the present invention in which the seat just reaches the proper or fully folded position.

When the rear seat 10 is further retrogressed or moved rearwardly from a position designated by the two-dotted chain line in FIG. 7 and is disposed right in front of the proper position designated by the solid line in FIG. 7, the projecting portion 60A of the stopper 60 is brought into contact with the rear portion of the lower end portion 46A of the first link 46 as shown in FIG. 8. When the rear seat 10 is further retrogressed and reaches the proper position designated by the solid line in FIG. 7, the projecting portion 60A of the stopper 60 pushes up the first link 46 in the skewed forward upper direction as shown in FIG. 9.

Figure 9:
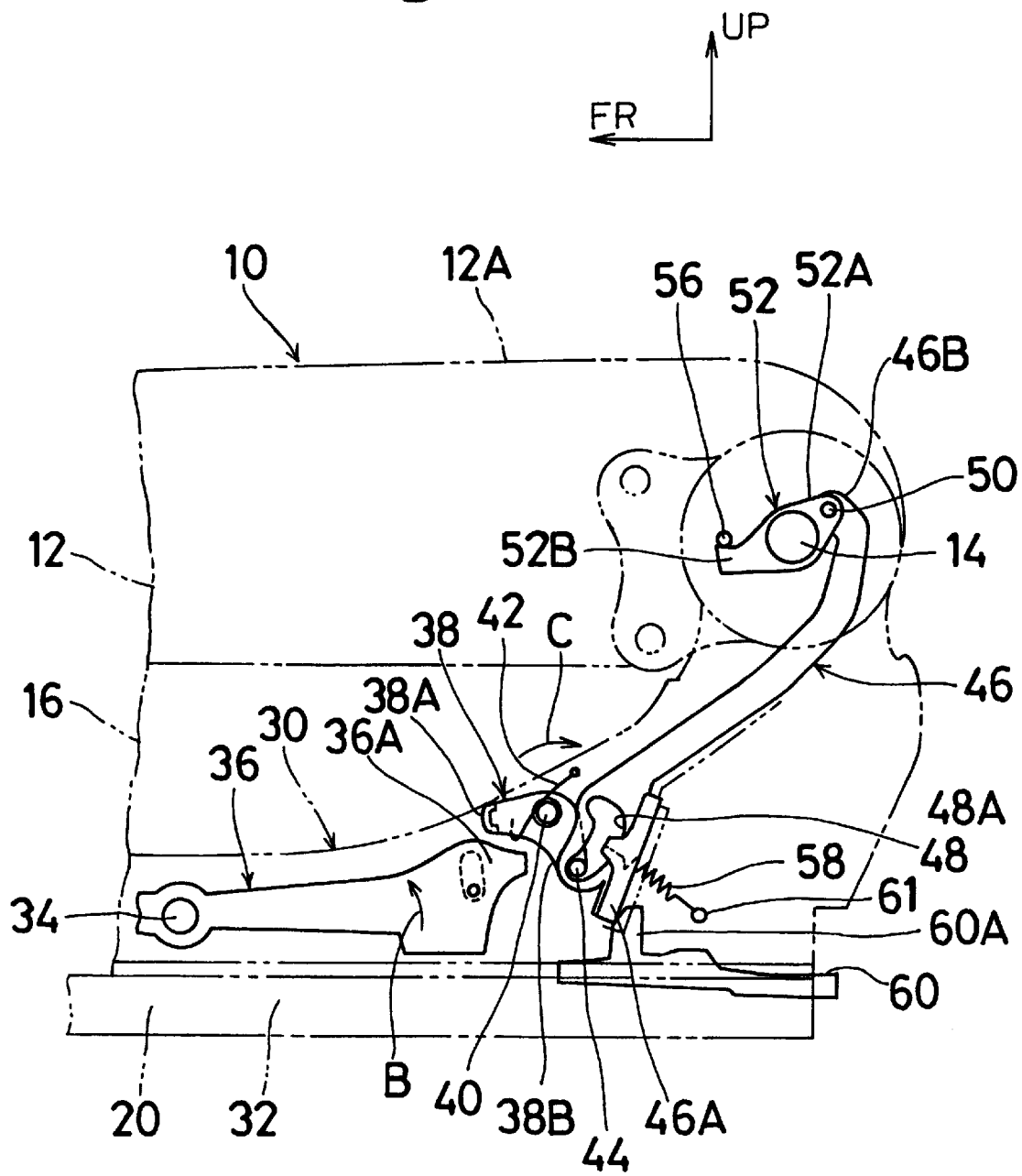
FIG. 9 is a side view of a portion of the vehicular seat structure according to the present invention in which the seat has reached the proper position.

As a result, the pin 44 is detached from the engaging portion 48A of the notch 48 of the link 46 and the bell crank 38 is rotated in the clockwise direction indicated by the arrow C in FIG. 9 by the urging force of the coil spring 42. The rear end portion 36A of the slide lock lever 36 is thus rotated in the counterclockwise direction indicated by the arrow B in FIG. 9 and the slide lock recovers once again to the locked state.

Therefore, as shown by the solid line in FIG. 7, when the seat back 12 is brought down forwardly and the space of the cargo compartment 22 formed rearwardly of the seat back 12 is enlarged, the seat back 12 is disposed at a position most adjacent to the upper floor portion 18B, and the gap 64 between the upper floor portion 18B constituting a floor portion of the expanded cargo compartment 22 and the seat back 12 is narrowed. As a result, the performance of use of the enlarged cargo compartment 22 is improved.

Also, according to the present invention, the rear seat 10 is moved rearwardly by the tension of the belts 24 after releasing the slide lock and so the overall construction is simplified. Further, the rear seat 10 is stopped by the stopper 60 after having retrogressed or moved to the proper position and the slide mechanism can be locked. Thus, the rear seat 10 can be held at the proper position.

Additionally, when the rear seat 10 is at the proper or fully folded position, the pin 44 is detached from the engaging portion 48A of the notch 48 and so even when the seat back 12 at a position for use is brought down forwardly, both the bell crank 38 and the slide lock lever 36 remain unmoved.

According to the vehicular seat structure of the present invention, when the acceleration operating on the first link 46 from the rear side of the vehicle reaches or exceeds the predetermined value "a" in the case where, for example, the front side of the vehicle collides with an object, the lower end portion 46A of the first link 46 is moved in the skewed forward upper direction (i.e., in the direction of the arrow K in FIG. 4) against the urging force of the coil spring 58. The pin 44 is thus detached from the engaging portion 48A of the notch 48 and so even when, for example, the seat back 12 is brought down forwardly and the first link 46 is pulled up in the direction of the arrow H in FIG. 3, the bell crank 38 is not rotated in the direction of the arrow D in FIG. 3 and the slide lock stays in the locked state. As a result, when an acceleration equal to or greater than the predetermined value "a" is applied to the seat back 12 from the rear side of the vehicle, the release of the slide lock can be prevented by the cancel mechanism.

Further, when the seat back 12 is brought down forwardly by the predetermined angle θ, the slide lock is automatically brought into a released state and when the seat 10 is retrogressed or moved to the proper position, the side lock is automatically brought back into a locked state. The operation of the vehicular seat structure is thus simple and firm.

Also, because the lock release mechanism is provided with the first link 46 having the L-shaped configuration and the notch 48, and the bell crank 38 is provided with the pin 44 that is inserted into the notch 48, the structure for carrying out the lock recovery operation at the proper position and the structure for carrying out the canceling operation at the position for use can he made common. Thus, the number of parts is reduced, and a relatively simple, lightweight and cost effective structure is realized.

Figure 10:
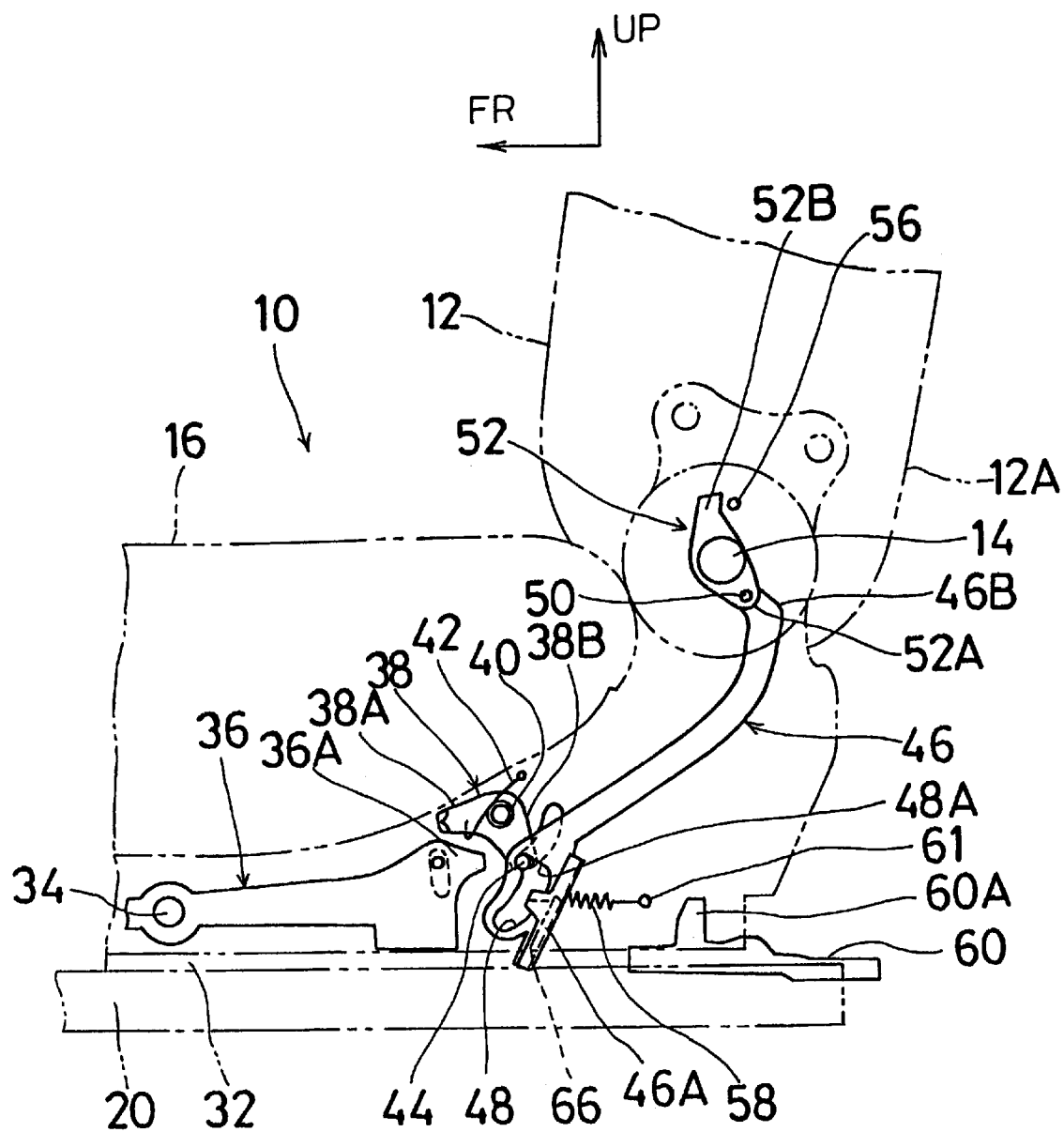
FIG. 10 is a side view of the vehicular seat structure according to a different embodiment of the present invention.
Figure 11:
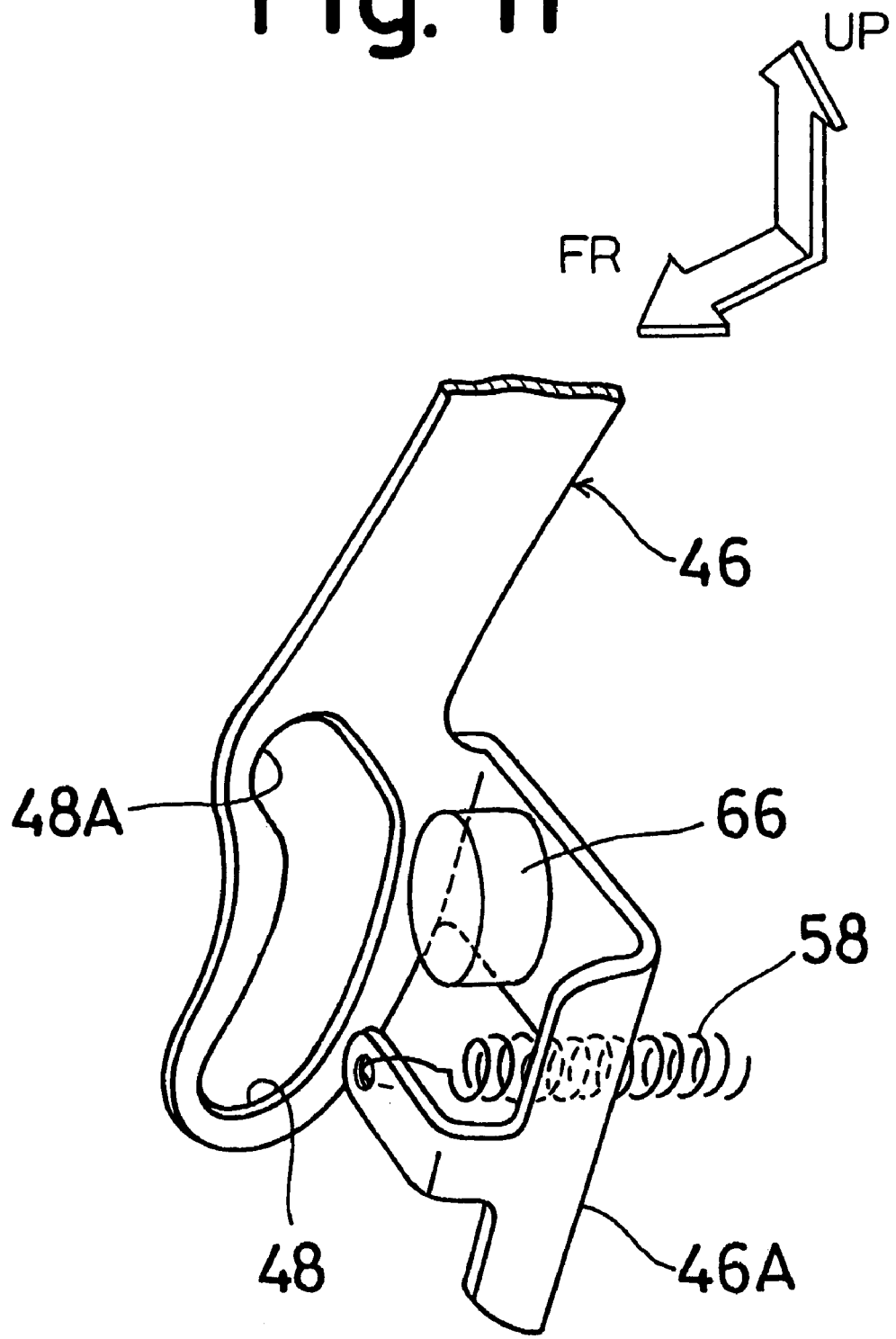
FIG. 11 is a perspective view of the lower end portion of a first link used in the vehicular seat structure shown in FIG. 10.

Although a detailed explanation has been given of a specific embodiment of the present invention, it is apparent that the present invention is not limited to such an embodiment and other various embodiments can be constituted within the scope of the present invention. For example, although according to the described embodiment, the mass "m" of the first link 46 is set to satisfy the relationship m>(F3×L2)/(a×L1) by which the slide lock is held in the locked state during, for example, a front collision of the vehicle, other arrangements are possible. For instance, as shown in FIG. 10 and FIG. 11, a weight 66 constituting a portion of the cancel mechanism can be attached to the link 46 in the vicinity of the lower end portion 46A of the first link 46 so that the mass "m" constituting the combination of the mass of the weight 66 and the mass of the first link 46 is set to the relationship of m>(F3×L2)/(a×L1). Further, in this case, the gravitational center M becomes the gravitational center of the member integral with the weight 66 and the first link 46.

Figure 12:
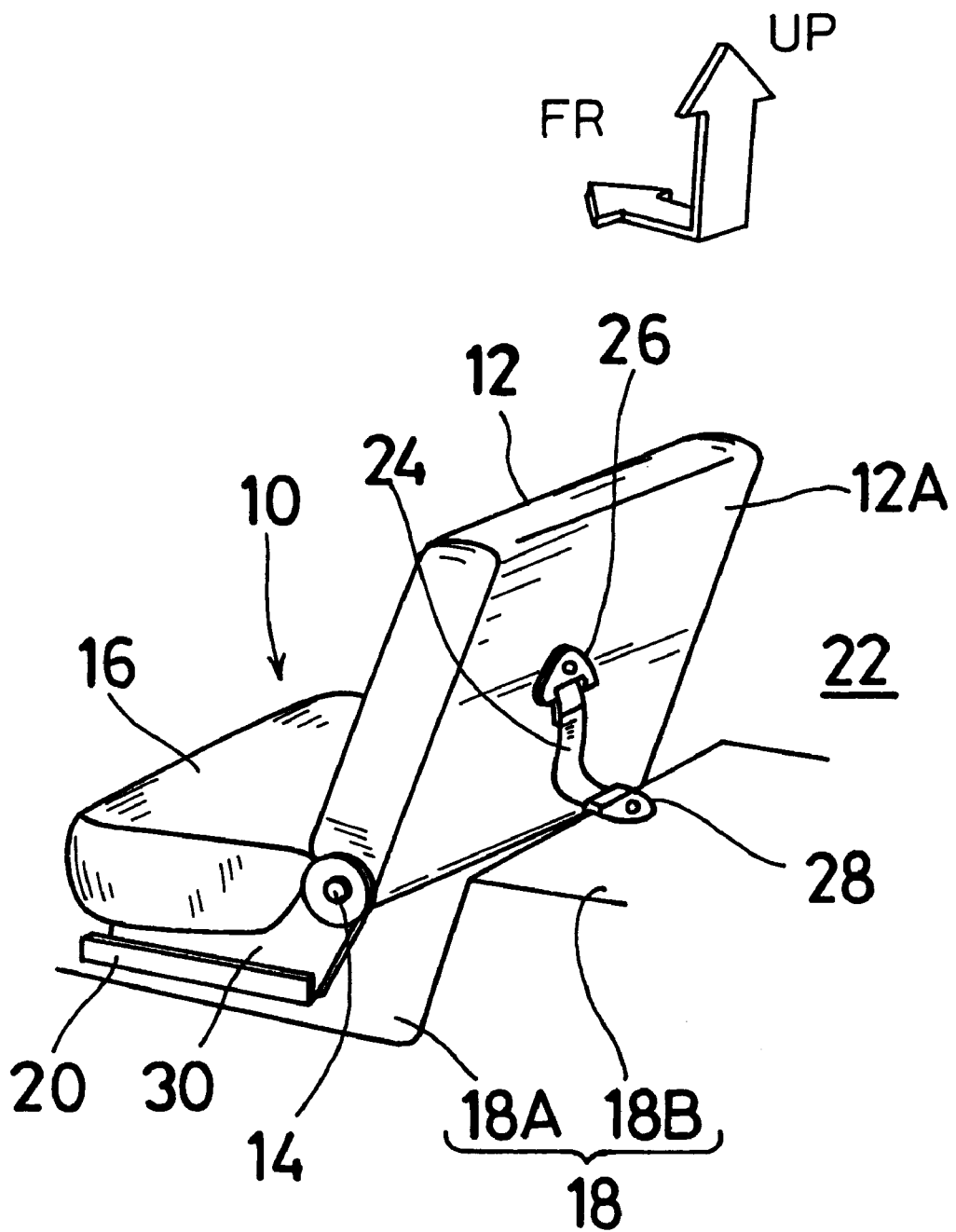
FIG. 12 is a perspective view of a rear seat to which the vehicular seat structure according to another embodiment of the present invention is applied.
Figure 13:
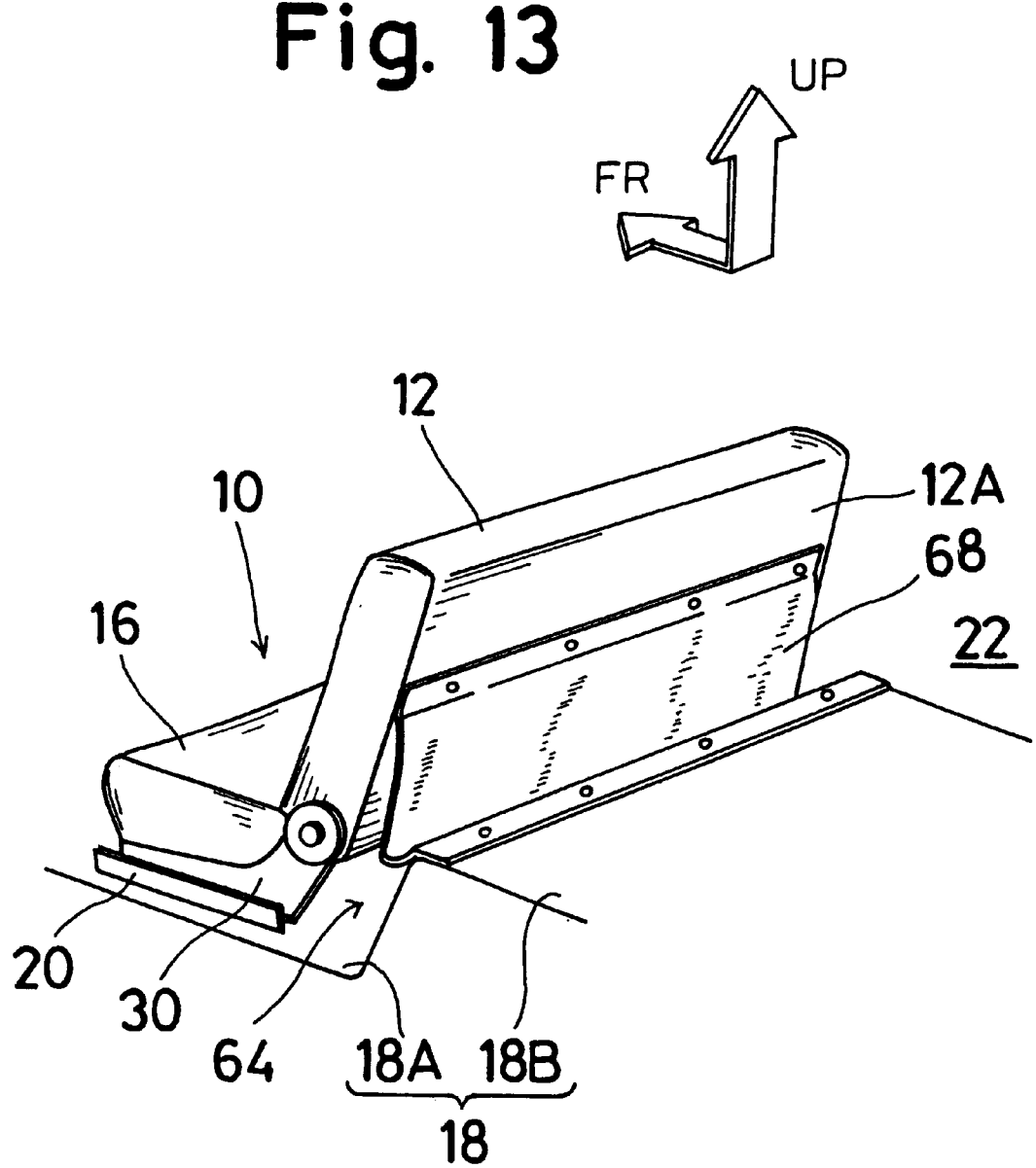
FIG. 13 is a perspective view of a rear seat to which the vehicular seat structure according to another embodiment of the present invention is applied.

As described above, two of the belts 24 are arranged as connecting members that connect the seat back 12 to the upper floor portion 18B. However, variations on this arrangement are possible. For example, as shown in FIG. 12, a single belt 24 could be employed. Also, more than two belts could be utilized. In place of the strip-like member in the from of a belt, other connecting members such as a string or the like may be used. Further, as shown in FIG. 13, in place of the belt 24, a sheet 68 extending along the width of the seat back 12a to have a width that is substantially the same as the width of the seat back 12a can be used as the connecting member constituting the moving mechanism. The use of the sheet 68 is additionally advantageous because it prevents small articles from entering the gap 64 between the upper floor portion 18B and the seat back 12.

The vehicle seat structure according to the present invention is described in the context of being applied to the rear seat 10 that is manually moved in the forward and rearward direction. However, the vehicular seat structure of the present invention is not limited in this regard, but rather is applicable to other seats such as the passenger seat next to the driver's seat. The vehicular seat structure according to the present invention is also applicable to a power seat which is moved by a drive device of a motor. In the case where the present invention is applied to a power seat, the structure can be configured so that when the seat back 12 is brought down forwardly by the predetermined angle θ, rearward movement of the seat is started by operating the drive device and when the seat reaches the proper or fully folded position, the drive device is stopped and the rearward movement of the seat is stopped.

From the foregoing, it can be seen that the present invention provides a vehicular seat structure that includes a slide mechanism for making a seat slidable in the forward and rearward direction of a vehicle and a reclining mechanism for bringing down the seat back to thereby enlarge the space for a cargo compartment by forwardly bringing down the seat back. The seat structure further includes a slide lock release mechanism for releasing the locking of the slide mechanism in cooperation with forwardly bringing down the seat back, and a moving mechanism for rearwardly moving the seat after releasing the locking of the slide mechanism. Therefore, when the cargo compartment is enlarged by forwardly bringing down the seat back of the passenger seat adjoining the driver or the rear seat, it is possible to reduce the gap between the floor portion of the cargo compartment and the seat back.

According to the vehicular seat structure of the present invention, the moving mechanism is in the form of a connecting member, one end of which is attached to the side of the cargo compartment of the vehicle body and other end of which is attached to the seat. This provides a rather simplified vehicular seat structure construction.

The stopper for stopping the seat after moving the seat to the proper position enables the locking of the slide mechanism to be recovered after stopping the seat from moving. Therefore, the seat can he held at the proper position.

The slide lock release mechanism includes a cancel mechanism for canceling the releasing of the locking of the slide mechanism when an acceleration of a predetermined value or more occurs from the rear side of the vehicle. The vehicular seat structure is thus capable of preventing the release of the slide lock when an acceleration is applied on the seat back from the rear side of the vehicle.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A vehicular seat structure comprising:
    a slide mechanism for making a seat slidable in a forward and rearward direction of a vehicle, said slide mechanism being adapted to be locked;
    a reclining mechanism for forwardly bringing down a seat back of the seat to enlarge a space of a cargo compartment of a vehicle;
    a slide lock release mechanism for releasing locking of the slide mechanism while forwardly bringing down the seat back; and
    a moving mechanism which rearwardly moves the seat after releasing the locking of the slide mechanism.

2. The vehicular seat structure according to claim 1, wherein the moving mechanism is a connecting member one end of which is adapted to be attached to a side of the cargo compartment of a vehicle body and an opposite end of which is adapted to be attached to the seat.

3. The vehicular seat structure according to claim 1, including a stopper for stopping movement of the seat once the seat has moved to a folded position, the slide mechanism being once again locked after movement of the seat has been stopped by the stopper.

4. The vehicular seat structure according to claim 1, wherein the slide lock release mechanism includes a cancel mechanism for canceling the releasing of the locking of the slide mechanism when an acceleration of a predetermined value or more from a rear direction of the vehicle occurs.

5. The vehicular seat structure according to claim 1, wherein the slide lock release mechanism includes a first link and a rotatably mounted bell crank from which a pin extends, one end portion of the first link being provided with a notch that is engaged by the pin.

6. The vehicular seat structure according to claim 5, including a stopper which is engaged by a portion of the first link upon sliding movement of the slide mechanism to effect locking of the slide mechanism.

7. A vehicular seat structure comprising:
    a seat that includes a seat back that is forwardly foldable to a folded position;

a slide mechanism operatively associated with the seat for permitting the seat to slide in a forward and rearward direction;

a slide lock lever for engaging the slide mechanism to lock the slide mechanism and prevent the seat from sliding in the rearward direction;

a reclining mechanism for forwardly bringing down the seat back of the seat;

a slide lock release mechanism operatively connected to the slide lock lever for releasing the slide lock lever in response to forwardly bringing down the seat back to permit the seat to slide in the rearward direction; and a stopper mechanism for engaging the slide lock release mechanism as the seat moves in the rearward direction to cancel release of the slide lock lever and cause the slide lock lever to engage the slide mechanism and lock the slide mechanism to prevent the seat from sliding.

8. The vehicular seat structure according to claim 7, wherein the slide lock release mechanism includes a first link and a rotatably mounted bell crank from which a pin extends, the bell crank being adapted to engage the slide lock lever open rotation of the bell crank to release the slide lock lever and permit sliding movement of the sliding mechanism.

9. The vehicular seat structure according to claim 8, wherein one end portion of the first link is provided with a notch in which is positioned the pin, the notch including an engaging portion that is engaged by the pin so that movement of the first link causes rotation of the bell crank.

10. The vehicular seat structure according to claim 9 wherein the slide lock release mechanism further includes a second link, said first link having an end portion opposite said one end portion that is connected to the second link so that rotation of the second link causes movement of the first link and rotation of the bell crank when the pin is engaged in the engaging portion of the notch.

11. The vehicular seat structure according to claim 9, including a spring engaging the bell crank to urge the bell crank in one rotational direction.

12. The vehicular seat structure according to claim 11, wherein the stopper mechanism includes a stopper which is engaged by a portion of the first link upon sliding movement of the seat to cause the first link to move so that the pin moves out of the engaging portion of the notch, whereby the bell crank is urged to a position by the spring that causes the slide lock lever to lock the slide mechanism.

13. The vehicular seat structure according to claim 9, wherein said one end portion of the first link is connected to a spring to urge the first link in a direction which causes said pin to engage the engaging portion of the notch.

14. A vehicular seat structure comprising:

a seat that includes a seat back that is forwardly foldable;

a slide mechanism operatively associated with the seat for permitting the seat to slide in a forward and rearward direction;

a slide lock lever for engaging the slide mechanism to lock the slide mechanism and prevent the seat from sliding in the rearward direction;

a reclining mechanism for forwardly bringing down the seat back of the seat;

a slide lock release mechanism operatively connected to the slide lock lever for releasing the slide lock lever to permit the seat to slide in the rearward direction; and a moving mechanism for automatically moving the seat in the rearward direction after releasing the slide lock lever.

15. The vehicular seat structure according to claim 14, wherein the slide lock release mechanism includes a first link and a rotatably mounted bell crank from which a pin extends, the bell crank being adapted to engage the slide lock lever to release the slide lock lever and permit sliding movement of the sliding mechanism.

16. The vehicular seat structure according to claim 15, wherein one end portion of the first link is provided with a notch in which is positioned the pin, the notch including an engaging portion that is engaged by the pin so that movement of the first link causes rotation of the bell crank, and a spring engaging the bell crank to urge the bell crank in one rotational direction.

17. The vehicular seat structure according to claim 14, wherein the moving mechanism includes a connecting element connected to the seat back and adapted to be connected to a portion of a cargo compartment in the vehicle.

18. A vehicular seat structure comprising:

a slide mechanism for making a seat slidable in a forward and rearward direction of a vehicle, said slide mechanism being adapted to be locked;

a reclining mechanism for forwardly bringing down a seat back of the seat to enlarge a space of a cargo compartment of a vehicle;

a slide lock release mechanism for releasing locking of the slide mechanism while forwardly bringing down the seat back, the slide lock release mechanism including a first link, a second link and a rotatably mounted bell crank from which a pin extends, one end portion of the first link being provided with a notch that is engaged by the pin, said first link having an end portion opposite said one end portion that is connected to the second link so that rotation of the second link causes movement of the first link and rotation of the bell crank; and a moving mechanism for rearwardly moving the seat after releasing the locking of the slide mechanism.

19. The vehicular seat structure according to claim 18, wherein the moving mechanism is a connecting member one end of which is adapted to be attached to a side of the cargo compartment of a vehicle body and an opposite end of which is adapted to be attached to the seat.

20. The vehicular seat structure according to claim 18, including a stopper for stopping movement of the seat once the seat has moved to a folded position, the slide mechanism being once again locked after movement of the seat has been stopped by the stopper.

21. The vehicular seat structure according to claim 18, wherein the slide lock release mechanism includes a cancel mechanism for canceling the releasing of the locking of the slide mechanism when an acceleration of a predetermined value or more from a rear direction of the vehicle occurs.

22. A vehicular seat structure comprising:

a seat that includes a seat back that is forwardly foldable;

a slide mechanism operatively associated with the seat for permitting the seat to slide in a forward and rearward direction;

a slide lock lever for engaging the slide mechanism to lock the slide mechanism and prevent the seat from sliding in the rearward direction;

a reclining mechanism for forwardly bringing down the seat back of the seat;

a slide lock release mechanism operatively connected to the slide lock lever for releasing the slide lock lever in response to forwardly bringing down the seat back to permit the seat to slide in the rearward direction, the slide lock release mechanism including a first link, a second link and a rotatably mounted bell crank from which a pin extends, the bell crank being adapted to engage the slide lock lever upon rotation of the bell crank to release the slide lock lever and permit sliding movement of the sliding mechanism, one end portion of the first link being provided with a notch in which is positioned the pin, the notch including an engaging portion that is engaged by the pin so that movement of the first link causes rotation of the bell crank, the first link having an end portion opposite said one end portion that is connected to the second link so that rotation of the second link causes movement of the first link and rotation of the bell crank when the pin is engaged in the engaging portion of the notch; and a moving mechanism for moving the seat in the rearward direction after releasing the slide lock lever.

23. A vehicular seat structure comprising:

a seat that includes a seat back that is forwardly foldable;

a slide mechanism operatively associated with the seat for permitting the seat to slide in a forward and rearward direction;

a slide lock lever for engaging the slide mechanism to lock the slide mechanism and prevent the seat from sliding in the rearward direction;

a reclining mechanism for forwardly bringing down the seat back of the seat;

a slide lock release mechanism operatively connected to the slide lock lever for releasing the slide lock lever in response to forwardly bringing down the seat back to permit the seat to slide in the rearward direction, the slide lock release mechanism including a first link and a rotatably mounted bell crank from which a pin extends, the bell crank being adapted to engage the slide lock lever upon rotation of the bell crank to release the slide lock lever and permit sliding movement of the sliding mechanism, one end portion of the first link being provided with a notch in which is positioned the pin, the notch including an engaging portion that is engaged by the pin so that movement of the first link causes rotation of the bell crank, the bell crank being engaged by a spring to urge the bell crank in one direction;

a stopper engaged by a portion of the first link upon sliding movement of the seat to cause the first link to move so that the pin moves out of the engaging portion of the notch, whereby the bell crank is urged to a position by the spring that causes the slide lock lever to lock the slide mechanism; and a moving mechanism for moving the seat in the rearward direction after releasing the slide lock lever.

24. A vehicular seat structure comprising:

a seat that includes a seat back that is forwardly foldable relative to a seat bottom;

a slide mechanism operatively associated with the seat for permitting the seat to slide in a forward and rearward direction;

a slide lock lever for engaging the slide mechanism to lock the slide mechanism and prevent the seat from sliding in the rearward direction;

a slide lock release mechanism operatively connected to the slide lock lever for releasing the slide lock lever to permit the seat to slide in the rearward direction, the slide lock release mechanism including a first link, a second link and a rotatably mounted bell crank from which a pin extends, the bell crank being adapted to engage the slide lock lever to release the slide lock lever and permit sliding movement of the sliding mechanism, one end portion of the first link being provided with a notch in which is positioned the pin, the notch including an engaging portion that is engaged by the pin so that movement of the first link causes rotation of the bell crank, and a spring engaging the bell crank to urge the bell crank in one rotational direction, said first link having an end portion opposite said one end portion that is connected to the second link so that rotation of the second link causes movement of the first link and rotation of the bell crank when the pin is engaged in the engaging portion of the notch.

25. A vehicular seat structure comprising:

a seat that includes a seat back that is forwardly foldable relative to a seat bottom;

a slide mechanism operatively associated with the seat for permitting the seat to slide in a forward and rearward direction;

a slide lock lever for engaging the slide mechanism to lock the slide mechanism and prevent the seat from sliding in the rearward direction;

a slide lock release mechanism operatively connected to the slide lock lever for releasing the slide lock lever to permit the seat to slide in the rearward direction, the slide lock release mechanism including a first link and a rotatably mounted bell crank from which a pin extends, the bell crank being adapted to engage the slide lock lever to release the slide lock lever and permit sliding movement of the sliding mechanism, one end portion of the first link being provided with a notch in which is positioned the pin, the notch including an engaging portion that is engaged by the pin so that movement of the first link causes rotation of the bell crank, and a spring engaging the bell crank to urge the bell crank in one rotational direction; and a stopper engaged by a portion of the first link upon sliding movement of the seat to cause the first link to move so that the pin moves out of the engaging portion of the notch, whereby the bell crank is urged to a position by the spring that causes the slide lock lever to lock the slide mechanism.

26. A seat structure for a vehicle comprising:

a seat that includes a seat back that is forwardly foldable;

a slide mechanism operatively associated with the seat for permitting the seat to slide in a forward and rearward direction;

a slide lock lever for engaging the slide mechanism to lock the slide mechanism and prevent the seat from sliding in the rearward direction;

a slide lock release mechanism operatively connected to the slide lock lever for releasing the slide lock lever in response to forwardly bringing down the seat back to permit the seat to slide in the rearward direction; and a cancel mechanism which cancels said releasing of the slide lock lever by the slide lock release mechanism upon occurrence of an acceleration from a rear direction of the vehicle that is equal to or greater than a predetermined value.

27. A seat structure for a vehicle comprising:

a slide mechanism for making a seat slidable in a forward and rearward direction of a vehicle, said slide mechanism being adapted to be locked;

a reclining mechanism for forwardly bringing down a seat back of the seat to enlarge a space of a cargo compartment of the vehicle;

a slide lock release mechanism for releasably locking the slide mechanism while forwardly bringing down the seat back, the slide lock release mechanism including a first link, a second link and a rotatably mounted bell crank from which a pin extends, the bell crank being adapted to engage the slide lock lever to release the slide lock lever and permit sliding movement of the sliding mechanism, one end portion of the first link being provided with a notch in which is positioned the pin, the notch including an engaging portion that is engaged by the pin so that movement of the first link causes rotation of the bell crank, and a spring engaging the bell crank to urge the bell crank in one rotational direction, said first link being connected to said second link so that rotation of the second link causes movement of the first link and rotation of the bell crank when the pin is engaged in the engaging portion of the notch, a stopper engaging a portion of the first link upon sliding movement of the seat to cause the first link to move so that the pin moves out of the engaging portion of the notch, whereby the bell crank is urged to a position by the spring that causes the slide lock lever to lock the slide mechanism.

* * * * *